United States Patent Office 3,778,412
Patented Dec. 11, 1973

3,778,412
POLY-as-TRIAZINES
Paul M. Hergenrother, Mercer Island, Wash., assignor to The Boeing Company, Seattle, Wash.
No Drawing. Continuation-in-part of application Ser. No. 139,884, May 3, 1971, which is a continuation-in-part of application Ser. No. 846,576, July 31, 1969, both now abandoned. This application Sept. 8, 1972, Ser. No. 287,407
Int. Cl. C08g 9/06
U.S. Cl. 260—50
25 Claims

ABSTRACT OF THE DISCLOSURE

Disclosed are poly-as-triazines, solutions thereof and processes for preparing same wherein a dihydrazidine and a bis-(1,2-dicarbonyl) compound are reacted in a solvent such as m-cresol, anisole or chloroform. The poly-as-triazines are particularly useful in high temperature adhesive, laminating resins, protective coatings and films.

CROSS REFERENCE TO RELATED APPLICATION

This application is a continuation-in-part of application Ser. No. 139,884, filed May 3, 1971 (now abandoned), which is in turn a continuation-in-part of Ser. No. 846,576, filed July 31, 1969 (now abandoned).

BACKGROUND OF THE INVENTION

This invention relates to novel poly-as-triazines, to novel solutions of poly-as-triazines, and to novel processes for preparing poly-as-triazines.

In U.S. Pat. No. 3,498,981 to Culbertson, it is disclosed that polymeric as-triazines having recurring units of the formula

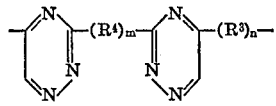

wherein $R^3$ and $R^4$ represent the same or different unsubstituted or substituted divalent hydrocarbon radicals of 1 to 20 carbon atoms, $n$ equals 0 or 1, and $m$ equals 0 or 1, can be prepared by reacting difunctional hydrazidines of the formula

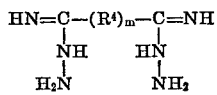

with a difunctional substituted glyoxal of the formula

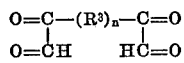

at temperatures of 20° C. to 300° C. and preferably 80° C. to 200° C. for a period of 2 minutes to 5 hours. In Example 8 of the Culbertson patent, the only example pertaining to the preparation of a polymeric as-triazine, there is disclosed a method of preparing a preferred polymer said to have the following recurring unit

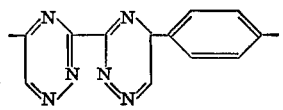

This method is described as follows:

"Oxamide-dihydrazone (2.05 g.) is dissolved in hexamethylphosphoramide (125 ml., at 60° C.), available from the Dow Chemical Company as 'Dorcol.' p-Diglyoxalbenzene dihydrate (4.00 g.) is added to this mixture. The resultant solution is heated for 3 hours at 195° C. and then cooled to room temperature (20° C.). The resultant viscous solution is poured, with stirring, into absolute methanol (700 ml.) and the dark precipitate so formed is collected by suction filtration. The precipitate is washed three times with absolute methanol and the washed material is dried under vacuum (0.2 mm. Hg) for 4 hours at 100° C. to obtain a 4.0 g. (theoretical 4.1 g.) yield of dark brown polymer having a melting point of greater than 450° C. The polymer is soluble in concentrated sulphuric acid and partially soluble in dimethylacetamide, dimethylformamide, and formic acid.

"Infrared and ultraviolet spectra studies give absorption bands characteristic of the as-triazine ring. Differential thermal and gravimetric analysis demonstrates that the polymer has excellent thermal stability in both air and nitrogen to over 400° C."

The poly-as-triazines of this invention can also be prepared by the reaction of a dihydrazidine (also "diamidrazone") and a bis-(1,2-dicarbonyl) compound. However, in contrast to the Culbertson polymer, the poly-as-triazines of this invention are amorphous and thus do not have true melting points, are essentially insoluble in hexamethylphosphoramide, decompose at or below about 400° C., and are pale yellow to yellowish-orange in color.

SUMMARY OF THE INVENTION

This invention is directed to poly-as-triazines comprising recurring units of the formula (I) 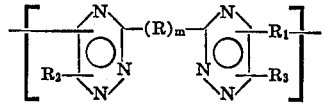

wherein $m$ is 0 or 1;
R is a divalent radical selected from

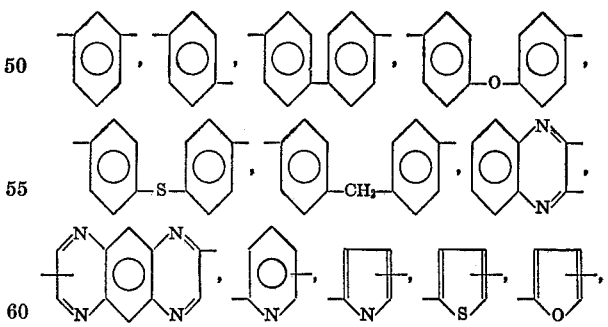

—$(CH_2)_y$—, and —$(CF_2)_y$— wherein $y$ is an integer of from 1 to 12;

$R_1$ is a divalent radical selected from

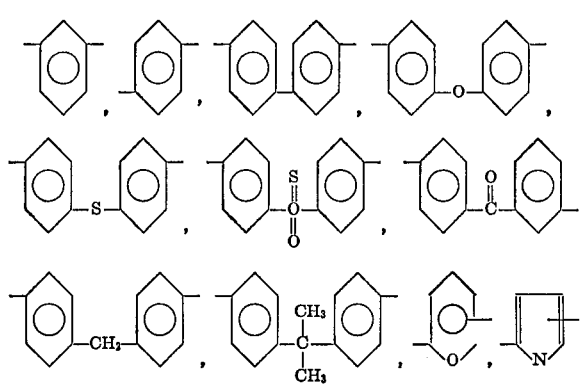

and —$(CH_2)_z$— where $z$ is an integer of from 2 to 12; and $R_2$ and $R_3$ are monovalent radicals individually selected from hydrogen, alkyl of 1 to 12 carbon atoms, phenyl and substituted phenyl. Substituted phenyl radicals from which $R_2$ and $R_3$ can be selected can contain any substantially inert substituents. By "substantially inert" is meant substantially inert under polymer forming conditions or noninterfering with polymer formation. Exemplary of such substituents are alkyl (e.g., 1 to 4 carbon atoms), —CN, —COOH, —$OR_5$ or —$COOR_5$ where $R_5$ is an alkyl (e.g., 1 to 10 carbon atoms), —$NO_2$, —$NH_2$, —Cl, —Br, and —$CF_3$. Preferably, the poly-as-triazines of this invention consist essentially of from 20 to 10,000 recurring units of Formula I.

The preferred poly-as-triazines of Formula I are those wherein $R_2$ and $R_3$ are selected from alkyl of 1 to 12 carbon atoms, phenyl and substituted phenyl. An especially preferred class of poly-as-triazines of Formula I are those wherein $R_2$ and $R_3$ are each phenyl radicals. These "polyphenyl-as-triazines" exhibit superior solubility, oxidative stability, and amenability to processing, i.e., better flow and wetting characteristics. High molecular weight [$\eta_{inh}$ (0.5% $H_2SO_4$ at 25° C.)=1.3 dl./g.] polyphenyl-as-triazines exhibit solubility characteristics unique for all aromatic heterocyclic polymers. These polymers readily form clear yellow to orange viscous solutions at ambient temperature in chloroform, sym-tetrachloroethane, m-cresol, or mixtures of m-cresol and toluene (1:4) at concentrations as high as 30% solids. Polyphenyl-as-triazines have exhibited excellent thermal-oxidative stability at 260° C. in air as determined by isothermogravimetric analysis on powders and also as determined by retention of film and adhesive properties after aging at 260° C. for 1500 hours. However, significant degradation occurred upon aging only 50 hours at 290° C. as indicated by weight losses of greater than 13%. An especially preferred class of polyphenyl-as-triazines are those consisting essentially of recurring unit of Formula I wherein $m$ is 0 or 1;
R is selected from

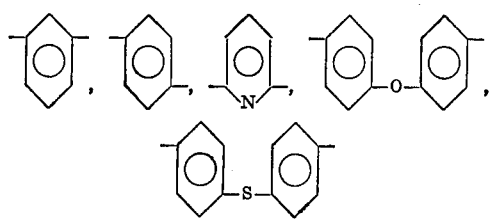

and —$(CF_2)_y$— where $y$ is an integer of from 1 to 12; and $R_1$ is selected from

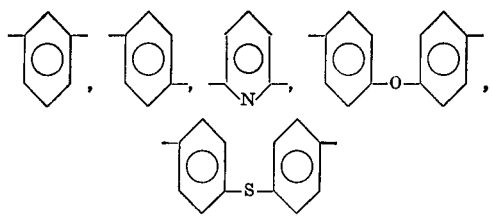

Preferably, these poly-as-triazines consist essentially of from 20 to 10,000 such units.

This invention is also directed to a process for the preparation of poly-as-triazines and solutions thereof comprising reacting a dihydrazidine and a bis-(1,2-dicarbonyl) compound in a solvent selected from the group consisting of m-cresol, anisole, pyridine, chloroform, sym-tetrachloroethane, mixtures of the foregoing and mixtures of xylene or toluene with m-cresol or sym-tetrachloroethane. For reasons discussed in detail hereinafter, it is preferably to employ from 0.5 to 2.5 mole percent excess of one of the reactants.

It is an object of this invention to provide amorphous poly-as-triazines and solutions thereof. Another object of this invention is to provide high molecular weight poly-as-triazines having good hydrolytic, oxidative and thermal stability. A further object is to provide high temperature adhesives, laminating resins, protective coatings, and films and membranes. Yet another object of this invention is to provide solutions of high molecular weight poly-as-triazines having solids contents of from about 10 to 30% by weight and to provide a process by which such solutions can be prepared. Still other objects will become apparent from the following detailed description of the invention.

DETAILED DESCRIPTION OF THE INVENTION

The poly-as-triazines consisting of recurring units of Formula I are prepared by the reaction of a dihydrazidine of the formula

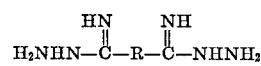

with a bis-(1,2-dicarbonyl) compound of the formula

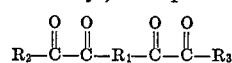

wherein R, $R_1$, $R_2$ and $R_3$ have the meanings ascribed thereto in reference to Formula I.

The poly-as-triazines of this invention can be prepared so as to contain quinoxaline as well as as-triazine moieties. As illustrated in Example 13, random-type copolymers can be prepared by reacting a bis-(1,2-dicarbonyl) compound with a mixture of dihydrazidine and a bis-(o-diamine). As illustrated in Example 14, block-type copolymers can be prepared by combining an oligomeric as-triazine solution and an oligomeric quinoxaline solution. Exemplary of the bis-(o-diamines) which can be so employed are those of the formula (IV) 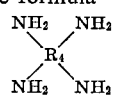

wherein $R_4$ is a tetravalent radical selected from

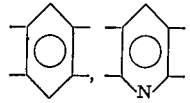

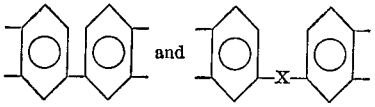

where X is —O—, —S—, —SO—, —$SO_2$—, —CO—, —$CH_2$—,

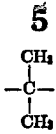

There can thus be introduced into the poly-as-triazines recurring units of the formula (V)

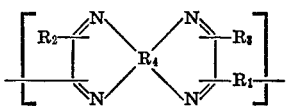

wherein $R_1$, $R_2$ and $R_3$ have the meaning ascribed thereto in reference to Formula I and $R_4$ has the meaning ascribed thereto in reference to Formula IV.

As indicated by Formula I, the reaction of the dihydrazidene and the bis-(1,2-dicarbonyl) compound can yield a mixture of isomers, i.e., -5,5'-, -5,6'-, and -6,6'-. The predominant isomer can be predicted based on a consideration of the relative reactivity of the carbonyl groups of the bis-(1,2-dicarbonyl) compound. The presence of isomeric units in the poly-as-triazines of this invention may be responsible for their amorphous character, excellent solubility and processability.

Preparation of the polymers of this invention is preferably carried out in a solvent selected from m-cresol, anisole, pyridine, chloroform, sym-tetrachloroethane, mixtures of these and mixtures of xylene or toluene with m-cresol or sym-tetrachloroethane. Using these solvents, solutions of high molecular weight poly-as-triazines having solids contents of up to 30% by weight and higher can be readily prepared. Solution polymerization to form poly-as-triazines is generally conducted by adding the bis-(1,2-dicarbonyl) reactant in the form of a solid, slurry or solution to a slurry of the dihydrazidine. The choice of solvent, rates of addition and mixing, and reaction temperature are important if polymer solutions of the highest quality are to be obtained.

The choice of solvent is governed by the structure of the polymer. m-Cresol is a universal solvent for all the poly-as-triazines. The remaining solvents referred to previously can also be used in the preparation of many of the poly-as-triazines. The use of mixtures of m-cresol and xylene in volume proportions of from 2:3 to 3:2 (preferably 1:1) has been found to yield polymer solutions of reduced viscosity as compared to solutions prepared using other solvents of this invention.

The choice of addition rate depends upon the form of bis-(1,2-dicarbonyl) compound being used. The addition of a solution should be effected more slowly than the addition of a slurry or solid. If the addition of the solution is effected to rapidly, cross-linking and branching in the polymer can result.

If the reaction temperature is too low, the reaction proceeds at an uneconomically slow rate while at temperatures too high; cross-linking and branching can occur. The optimum reaction temperature varies with the reactivity and solubility of the reactants. Preparation of the polyphenyl-as-triazines of this invention is preferably carried out at temperatures of from about 10° to about 40° C., while the preparation of the remaining poly-as-triazines of this invention is preferably carried out at temperatures of from about 25° to about 75° C.

The poly-as-triazines of this invention may be prepared using a salt of the dihydrazidine such as a dihydrochloride. The desired dihydrazidine compound is generated from the salt in situ during the cource of the reaction. An acid acceptor such as sodium carbonate, sodium acetate, triethyl amine or pyridine can be included in the reaction mixture.

In the following examples all parts and percentages are by weight unless otherwise indicated. Examples 1 through 5 are directed to the preparation of various reactants employed in subsequent examples. The remaining examples pertain to the preparation and characterization of poly-as-triazines of this invention.

Example 1

Hydrazine hydrate (95%, 20 ml.) was added to a solution of 2,6-dicyanopyridine (2.8 gm.) in 250 ml. ethanol at 40° C. The resulting clear yellow solution was stirred at 45–50° C. for two hours to form a white suspension which was cooled and filtered. The resulting white solid was recrystallized from water (250 ml.) to afford pale yellow needles (3.0 gm., 75% yield) of 2,6-pyridinediyl dihydrazidine, M.P. 230°–231° C. with decomposition.

Analysis.—Calcd. for $C_7H_{11}N_7$ (percent): C, 43.51; H, 5.74; N, 50.76. Found (percent): C, 43.72; H, 5.76; N, 50.77.

Example 2

Hydrogen chloride was bubbled through a solution of terephthalonitrile (12.8 gm. 0.010 mole) in absolute ethanol (250 ml.) at 20°–25° C. for 18 hours to precipitate the di(imino ether hyrochloride) as a white solid. The solid was isolated by filtration and washed with absolute ethanol to yield 26.2 gm. (90% yield). The di-(imino ether hydrochloride) (20.0 gm., 0.07 mole) was slurried in absolute ethanol (200 ml.) and at 5°–10° C., hydrazine (97%; 5.0 gm., 0.15 mole) in absolute ethanol (20 ml.) and anhydrous sodium carbonate (15.8 gm., 0.15 mole) were added portionwise during one hour. The resulting yellow reaction mixture was stirred at 5° C. for one hour followed by pouring into ice water. The addition of aqueous hydrochloric acid precipitated a white solid, p-phenylenedihydrazidine dihydrochloride. The p-phenylenedihydrazidine dihydrochloride was purified by dissolving in cold dilute aqueous hydrochloric acid and adding excess cold concentrated hydrochloric acid to reprecipitate the dihydrazidine dihydrochloride as a white solid. The dihydrazidine dihydrochloride was dried over phosphorus pentoxide at ambient temperature under high vacuum.

Analysis.—Calcd. for $C_8H_{14}N_6Cl_2$ (percent): C, 36.23; H, 5.33; N, 31.70; Cl, 26.74. Found (percent): C, 35.97; H, 5.46; N, 31.33; Cl, 26.71.

Other dihydrazidines such as the 3,5-pyridinediyl, m-phenylene, and hexamethylene were prepared from the reaction of hydrazine with the corresponding di(imino ether). These dihydrazidines are isolated as the dihydrochloride and can be successfully employed in polymer formation by using an acid acceptor such as sodium carbonate, triethyl amine, or pyridine in the reaction mixture.

Example 3 p,p'-Diacetyldiphenyl ether prepared by the Friedel-Crafts acetylation of diphenyl ether in methylene chloride was oxidized with selenium dioxide in aqueous dioxane. The crude product was recrystallized from a mixture of dioxane and water (2:1) to afford white crystals (60% overall yield) of p,p'-oxybis(phenyleneglyoxal hydrate), M.P. 140.5°–142° C.

Analysis.—Calcd. for $C_{16}H_{14}O_7$ (percent): C, 60.38; H, 4.43. Found (percent): C, 60.18; H, 4.41.

Example 4

A solution of diphenyl ether (17.0 gm., 0.10 mole) and phenylacetyl chloride (30.9 gm., 0.20 mole) in methylene chloride (50 ml.) was added during 1 hour to a suspension of anhydrous aluminum chloride (26.6 gm., 0.20 mole) in methylene chloride (150 ml.) at 15°–20° C. under nitrogen. The resulting brown reaction mixture was stirred at ambient temperature for 18 hours followed by pouring onto crushed ice and hydrochloric acid. The organic phase was separated and washed successively with water, aqueous sodium bicarbonate, and water followed by driyng over anhydrous magnesium sulfate. Concentration to about 74 ml. followed by cooling provided a cream colored solid (33.0 gm. 82% yield), M.P. 166°–168.5° C. Recrystallization from benzene afforded near white crystals of p,p′-di(phenylacetylphenyl) ether, M.P. 169°–170° C. To a mixture of selenium dioxide (11.1 gm., 0.10 mole) in glacial acetic acid (150 ml.) at 60° C., p,p′-di(phenylacetylphenyl) ether (20.0 gm., 0.050 mole) was added. The reaction mixture was refluxed for 24 hours followed by a hot filtration. The clear yellow filtrate was concentrated to about 75 ml. and cooled to provide a yellow solid (18.5 gm., 86% yield), M.P. 103°–106° C., after thorough washing with methanol. Recrystallization from a mixture of ethyl acetate and n-hexane afforded yellow crystals of p,p′-oxydibenzil, M.P. 108°–109° C.

Analysis.—Calcd. for $C_{28}H_{18}O_5$ (percent): C, 77.41; H, 4.18. Found (percent): C, 77.38; H, 4.10.

Example 5

A benzene (300 ml.) solution of the diacid chloride of p-phenylenediacetic acid (73.0 gm., 0.3 mole) was added during 1.5 hours to a stirred slurry of anhydrous aluminum chloride (100 gm., 0.75 mole) in benzene (250 ml.) at 10°–20° C. After complete addition, the resulting thick green reaction mixture was stirred at ambient temperature for 10 hours followed by pouring into ice water containing hydrochloric acid. The white solid which precipitated was washed successively in a blender with water, aqueous sodium carbonate, and water. The resulting white solid was dried to yield p-di(phenacyl) benzene (85.0 gm., 85% yield), M.P. 205°–207° C. p-Di(phenacyl) benzene (40.0 gm., 0.13 mole) was added to a slurry of selenium dioxide (29.0 gm., 0.26 mole) in acetic acid (470 ml.) and the reaction mixture was heated to and maintained at the reflux temperature for 20 hours. The hot reaction mixture was treated with charcoal and filtered hot to yield a clear yellow solution. Dilution with water (400 ml.) followed by cooling provided a yellow solid which was isolated and washed with methanol. The resulting yellow solid (29 gm., 67% yield), M.P. 124°–126° C., was recrystallized from a mixture of benzene and hexane (1:1) to afford yellow crystals of p-di(phenylglyoxalyl) benzene (26 gm.), M.P. 125°–126° C.

Analysis.—Calcd. for $C_{22}H_{14}O_4$ (percent): C, 77.19; H, 4.12. Found (percent): C, 67.08; H, 4.17.

Example 6 p-Phenylenedihydrazidine dihydrochloride was slurried in m-cresol at 10% solid content, at 20° C. A slurry of p,p′-di(phenylglyoxalyl) benzene in pyridine at 10% solid content was added over a period of about 5 minutes. The yellowish-orange reaction mixture was stirred at ambient temperature for 18 hourus followed by pouring into a mixture of methanol and water to precipitate a fibrous yellow solid. The solid was washed in a blender successively with aqueous sodium carbonate, water, and methanol, then dried. Poly[3,3′-(p-phenylene)-6,6′-(p-phenylene)di(5′-phenyl-as-triazine)] and isomers thereof were formed. The polymer may then be advanced by dissolving in m-cresol and heating to 100° C.

Example 7

Poly[3,3′ - (2″,6″-pyridinediyl)-6,6′-(p,p′-carbonyldiphenylene)di(5 - phenyl-as-triazine)] was prepared by adding p,p′-carbonyldibenzil (4.4643 gm., 0.010 mole) to a solution of 2,6-pyridinediyl dihydrazidine (1.9322 gm., 0.010 mole) in m-cresol (25.6 ml.) at ambient temperature. After stirring for 0.5 hr. at ambient temperature, a portion of the viscous yellow solution was poured into methanol in a Waring Blendor to precipitate a fibrous yellow solid. The yellow solid was thoroughly washed with methanol and dried for 4 hours. at 150° C. in vacuo. The resulting intermediate yellow polymer exhibited a polymer softening temperature of 300–309° C. and an inherent viscosity ($\eta_{inh}$, 0.5% $H_2SO_4$ at 25° C.) of 0.74.

The remaining m-cresol solution was placed under a nitrogen atmosphere and refluxed (200° C.) for 1 hr. The final polymer was isolated by pouring the viscous yellow m-cresol solution into methanol in a Waring Blendor followed by thorough washing with methanol and drying for 4 hrs. at 150° C. in vacuo. The $\eta_{inh}$ in the final polymer was 1.23. Additional characterization is provided in Tables I and II below.

Example 8

A series of polyphenyl-as-triazines of the formula

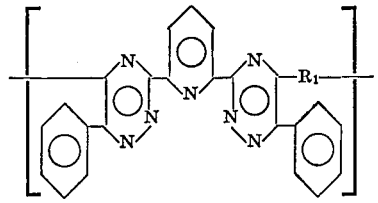

and isomers thereof wherein $R_1$ is as shown in Tables I and II below were prepared by reacting stoichiometric quantities of 2,6-pyridinediyl dihydrazidine with various dibenzils of the formula

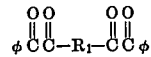

in m-cresol at 20% solids content. At ambient temperature, clear yellow to light orange viscous solutions formed in less than 0.5 hr. Clear lemon yellow films cast from these solutions exhibited good toughness and flexibility. The polymers were isolated from solution by quenching with methanol in a Waring Blendor to provide light yellow fibrous solids. Characterizations of the intermediate polymers after drying for 4 hours at 150° C. in vacuo are provided in Table I. The polymer softening temperatures (PST) reflect the thermoplastic nature of these polymers and also is indicative of their good processability. The intermediate polymers were advanced to final polymers by heating their m-cresol solutions at the reflux temperature for 1 hr. under nitrogen. Although the final polymers were of relatively high molecular weights, e.g., $\eta_{inh}$=1.3 dl./g. (Table I), they exhibited solubility characteristics unique for all aromatic heterocyclic polymers. The polymers readily formed clear yellow to orange viscous solutions at concentrations as high as 30% solids content in chloroform or sym-tetrachloroethane. In a mixture of toluene and m-cresol (4:1), the polymers readily formed clear solutions at concentration as high as 20% solids content. In solvents such as N,N-dimethylformamide, N,N-dimethylacetamide, or N-methylpyrrolidone, the polyphenyl-as-triazines failed to form clear solution at solids content as low as 1%.

The thermal properties of the final polymers are presented in Table II. The glass transition temperatures ($T_g$) were determined by dielectric loss measurements at a heating rate of 10° C./min. and a frequency sweep of 100 to 1000 cycles/sec. on films cast from m-cresol solutions and dried at 150° C. in vacuo for 4 hours. The polymer films were cycled in the dielectric test apparatus to 250° C. in vacuo to remove residual solvent prior to a $T_g$ determination. The polyphenyl-as-triazine containing the rigid p-phenylene moiety exhibited the highest $T_g$ while the polyphenyl-as-triazines containing flexibilizing moieties such as diphenyl ether and diphenylmethane displayed lower $T_g$'s.

The thermal stability of the polymers was determined by thermogravimetric (TGA) and isothermogravimetric analyses (ITGA). The polymers undergo a two stage decomposition in both air and nitrogen and exhibit higher apparent stability in air than in nitrogen. The temperature of initial weight loss ($T_1$) and the temperature of the initial break ($T_2$) as shown in Table II is higher in air than in nitrogen for all polyphenyl-as-triazines except the polymer containing the diphenylmethane moiety.

The polyphenyl-as-triazines exhibited excellent stability at 260° C. (500° F.) in air but at 290° C. (554° F.) significant weight losses (13–36%) occurred after 50 hours. Isothermal weight loss data is given in Table II.

TABLE I

| R₁ | Intermediate polymer [1] | | η inh, dl./g.[4] | Final polymer [2] | | | |
|---|---|---|---|---|---|---|---|
| | PST, °C.[3] | η inh, dl./g.[4] | | Formula | Elemental analysis,[5] (percent) | | |
| | | | | | C | H | N |
|  | 320–329 | 0.92 | 1.32 | $(C_{20}H_{17}N_7)_n$ | 75.87 (75.80) | 2.83 (2.85) | 21.27 (21.34) |
|  | 287–296 | 0.84 | 1.27 | $(C_{20}H_{17}N_7)_n$ | 75.64 (75.80) | 2.81 (2.85) | 21.29 (21.34) |
| 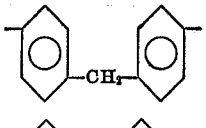 | 270–280 | 0.65 | 1.18 | $(C_{36}H_{23}N_7)_n$ | 77.98 (78.10) | 4.15 (4.19) | 17.65 (17.71) |
| 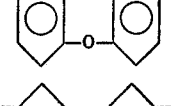 | 278–287 | 0.85 | 1.25 | $(C_{35}H_{21}N_7O)_n$ | 75.76 (75.66) | 3.79 (3.81) | 17.52 (17.65) |
| 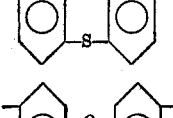 | 282–290 | 0.77 | 1.19 | $(C_{35}H_{21}N_7S)_n$ | 73.61 (37.53) | 3.67 (3.70) | 17.11 (17.16) |
| 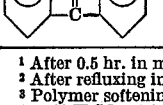 | 300–309 | 0.74 | 1.23 | $(C_{36}H_{21}N_7O)_n$ | 76.04 (76.17) | 3.71 (3.73) | 17.19 (17.28) |

[1] After 0.5 hr. in m-cresol at ambient temperature, dried 4 hr. at 150° C. in vacuo.
[2] After refluxing in m-cresol under nitrogen for 1 hr., dried as above.
[3] Polymer softening temperature.
[4] 0.5% H₂SO₄ at 25° C.
[5] Theoretical values reported in parentheses.

TABLE II

| R₁ | Tg, °C.[1] | Thermogravimetric analysis [2] | | | | Isothermal weight loss, percent | | | |
|---|---|---|---|---|---|---|---|---|---|
| | | Air | | Nitrogen | | 260° C. (500° F.) | | 290° C. (554° F.) | |
| | | T₁, °C.[3] | T₂, °C.[4] | T₁, °C.[3] | T₂, °C.[4] | 100 hr. | 200 hr. | 50 hr. | 150 hr. |
|  | 260 | 395 | 405 | 370 | 395 | 1.0 | 1.1 | 22.8 | 58.6 |
|  | ........ | 390 | 410 | 375 | 390 | 1.1 | 1.3 | 23.8 | 59.4 |
| 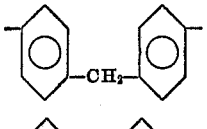 | 205 | 320 | 350 | 320 | 362 | 1.4 | 1.5 | 35.8 | 73.7 |
| 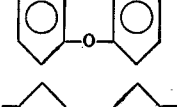 | 223 | 380 | 420 | 355 | 390 | 0.9 | 1.2 | 24.5 | 74.1 |
| 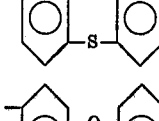 | ........ | 380 | 415 | 360 | 395 | 1.3 | 1.4 | 13.2 | 71.9 |
| 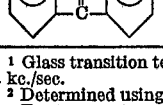 | ........ | 385 | 410 | 365 | 388 | 0.8 | 1.1 | 18.6 | 61.3 |

[1] Glass transition temperature, determined by dielectric loss measurements in vacuo at ΔT=10° C./min. and 1 kc./sec.
[2] Determined using a Dupont 950 thermalgravimetric analyzer at ΔT=6° C./min.
[3] T₁=temperature of initial weight loss.
[4] T₂=polymer decomposition temperature of initial break.

As indicated previously, care should be exercised in the selection of the solvent, addition time and reaction temperature used in the preparation of the polymers of this invention. However, even when care is exercised in the selection of the solvent, addition time and reaction solutions will occasionally exhibit various degrees of gelling or become extremely thick and unworkable (e.g., have a Brookfield viscosity of greater than 90,000 cps.). The gelling or thickening occurs either immediately after preparation or upon standing, and is particularly likely to occur when the reactants used are very pure and when the molecular weight of the polymers and the solids content of the solution are high (i.e., at least 15% by weight). Polyphenyl-as-triazines (i.e., polymers of Formula I wherein $R_2$ and $R_3$ are "phenyl") are particularly susceptible to gelling or thickening. If the reactants used in the polymer preparation are not of high purity, the gelling problem is less serious. However, the use of impure reactants is not an attractive solution to the gelling problem because the oxidative stability and mechanical performance of the final polymer are usually diminished as compared to polymers prepared from high purity reactants.

In general, stoichiometric quantities of AA–BB type monomers are required in the preparation of high molecular weight, condensation type polymers (excluding those produced by interfacial condensation). It has been found, however, that exact stoichiometric amounts of reactants need not be used in the preparation of high molecular weight poly-as-triazines and that the gelling problem referred to can be substantially avoided by upsetting the stoichiometry from about 0.5 to about 2.5 mole percent (preferably 0.5% to 1.0%) in favor of one or the other reactants. The effect of upsetting the stoichiometry in the preparation of two polymers of this invention is shown in Tables III and IV. In the experiment summarized in Table III, p,p'-oxydibenzil (ODB) was reacted with 2,6-pyridinediyl dihydrazidine (PDH) to yield a polyphenyl-as-triazine of the formula (II)

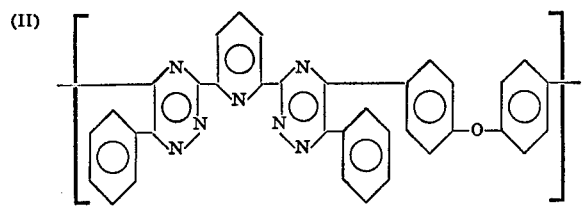

and isomers thereof. In the experiment of Table IV, p-di(phenylglyoxalyl) benzene (DPGB) was reacted with 2,6-pyridinediyl dihydrazidine (PDH) to yield a polyphenyl-as-triazine of the formula (III)

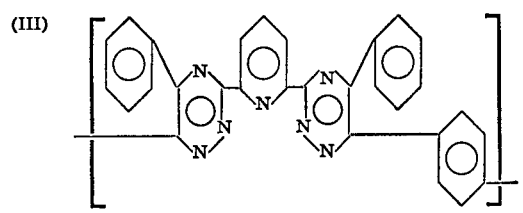

and isomers thereof. Except where indicated in Table III, the reactions were carried out at 25° C. in m-cresol as a solids content of 20%, the solids content being based on the reactants rather than the final polymer.

TABLE III

| Grams (mole) | | Remarks[1] | $\eta_{inh}$, dl./g.[2] |
|---|---|---|---|
| ODB | PDH | | |
| 3.345 (0.010) | 1.932 (0.010) | Viscous | 0.93 |
| 4.345 (0.010) | [3] 1.932 (0.010) | Fairly viscous | 0.87 |
| 4.345 (0.010) | [4] 1.932 (0.010) | Viscous | 0.81 |
| 4.345 (0.010) | 1.922 (0.00995) | do | 0.90 |
| 4.323 (0.00995) | 1.392 (0.010) | Fairly viscous | 0.91 |
| 4.345 (0.010) | 1.903 (0.00985) | do | 0.84 |
| 4.280 (0.00985) | 1.932 (0.010) | do | 0.81 |
| 4.236 (0.00975) | 1.932 (0.010) | do | 0.55 |

[1] "Viscous"—about the consistency of molasses; "fairly viscous"—pours readily at room temperature.
[2] Inherent viscosity, 0.5% $H_2SO_4$ at 25° C.
[3] m-Cresol=xylene (1:1).
[4] At 5° C.

TABLE IV

| Grams (mole) | | Remarks[1] | $\eta_{inh}$, dl./g.[2] |
|---|---|---|---|
| ODB | PDH | | |
| 3.424 (0.010) | 1.932 (0.010) | Very viscous | 1.21 |
| 3.424 (0.010) | 1.922 (0.00995) | Viscous | 1.14 |
| 3.406 (0.00995) | 1.932 (0.010) | do | 1.07 |
| 3.424 (0.010) | 1.903 (0.00985) | do | 0.95 |
| 3.373 (0.00985) | 1.932 (0.010) | do | 0.97 |
| 3.424 (0.010) | 1.884 (0.00975) | Fairly viscous | 0.72 |
| 3.338 (0.00975) | 1.932 (0.010) | do | 0.74 |

[1] "Very viscous"—essentially unpourable; "viscous" and "fairly viscous"—as in Table III.
[2] Inherent viscosity, 0.5% $H_2SO_4$ at 25° C.

In Table V are shown the effects of stoichiometric imbalance upon the properties of polyphenyl-as-triazines prepared by reacting oxalamidrazone and p,p'-oxydibenzil (20% solids content in 1:1 mixture of m-cresol and xylene, 0.02 mole scale). It will be noted that, when the stoichiometry was upset by 1% in favor of either reactant, relatively high molecular weight polymers ($\eta_{inh}$, dl./g.=1.61 and 1.76)

were obtained and that films prepared therefrom provided high tensile strengths (14,100 and 14,900 p.s.i.). Even when the stoichiometry was upset by 2.5%, film forming polymers with $\eta_{inh}$ of 1.07 and 1.26 were obtained.

TABLE V

| Mo.e of oxalamidrazone per 1.000 mole benzil | Solution viscosity, cps.[1] | $\eta_{inh}$, dl./g.[2] | Film (tensile strength, p.s.i.) |
|---|---|---|---|
| 0.975 | 24,000 | 1.07 | 6,700 |
| 0.985 | 35,000 | 1.23 | 8,300 |
| 0.990 | 78,000 | 1.61 | 14,100 |
| 0.995 | 87,300 | 1.92 | 16,900 |
| 1.000 | 115,000 | 2.31 | 17,400 |
| 1.005 | 84,000 | 1.87 | 16,400 |
| 0.010 | 80,600 | 1.76 | 14,900 |
| 1.015 | 52,000 | 1.44 | 9,200 |
| 1.025 | 35,500 | 1.26 | 7,000 |

[1] Brookfield viscosity at 25° C.
[2] 0.5% m-Cresol solution at 25° C.

Although the oxidative stability of the poly-as-triazines of this invention is very good, it can be even further improved by "capping" the end groups of the polymer chains to provide polymers which contain fewer reactive end groups which would otherwise serve as potential centers to initiate oxidative degradation of the polymer. Thus, when the stoichiometry is upset to provide polymer molecules rich in hydrazidine end groups, benzil, or another compound such as benzoyl chloride, capable of reacting with the hydrazidine end groups is used to form a more stable moiety such as an as-triazine or 1,2,4-triazole ring. If the polymer molecules are rich in 1,2-dicarbonyl end groups, then a compound, such as o-phenylenediamine or 2-pyridylhydrazidine, capable of forming a stable end group such as a quinoxaline or as-triazine ring respectively, is used.

The amount of end-capping compound used can vary from a stoichiometric quantity to a large excess. The excess end-capping reagent can be removed by precipitation of the polymer or by leaching from a film or coating prepared from the polymer solution. End-capping can also be employed advantageously to improve the oxidative stability of poly-as-triazines prepared from stoichiometric amounts of reactants. Example 9 illustrates the procedure employed to end-cap a polyphenyl-as-triazine of Formula II above.

Example 9

To a stirred slurry of 2,6-pyridinediyl dihydrazidine (PDH—19.32 gm., 0.100 mole) in a mixture of xylene and m-cresol (1:1, 220 ml.), p,p'-oxydibenzil (ODB—42.58 gm., 0.098 mole) as a fine powder was added during a period of approximately 5 min. at 25° C. The residual p,p'-oxydibenzil was washed down with additional solvent [m-cresol: xylene (1:1), 32 ml.] and the reaction mixture was stirred about 0.5 hr. at 25° C. to form a viscous yellowish orange solution. After stirring an additional 2 hrs. at ambient temperature, the solution was divided into two equal portions. To one stirred portion, benzil (0.210 gm., 0.001 mole) was added as a fine powder at ambient temperature. Stirring was continued 4 hrs. forming a clear yellowish orange solution after about one hour. Films were cast from the two solutions by doctoring a portion of each onto a glass plate, followed by drying in a forced air oven at 60° C. for 18 hrs., in vacuo from room temperature to 200° C. during 2 hrs., and at 200° C. in vacuo for 4 hours. The resulting clear yellow films exhibited high tear resistance, tensile strength and flexibility.

The remaining portions of the polymer solutions were diluted with solvent (1:1, m-cresol: xylene) and then separately poured slowly into methanol in a Waring Blendor to precipitate yellow solids. The solids were thoroughly washed in boiling methanol and dried at 150° C. in vacuo for 4 hours. The polymer decomposition temperatures of each of the solids as measured by thermogravimetric analysis at a heating rate of 6° C./min. in air and in helium were essentially identical. However, the oxidative stability of the end-capped polymer as evidenced by isothermal weight loss measurements on powders (<60 mesh) and retention of film properties at 525° F. (274° C.) in static air were improved as shown in Table VI.

The above procedure was also used to prepare a polymer from 18.93 gm. (0.098 mole) of 2,6-pyridinediyl dihydrazidine and 43.45 gm. (0.100 mole) of p,p'-oxydibenzil. The resulting yellowish orange solution was divided into two equal portions and o-phenylenediamine (1.081 gm., 0.001 mole) was added to one of the stirred portions. Films cast from portions of these solutions also exhibited high tear resistance, tensile strength and flexibility. The remainder of the solutions were processed as described above and the results are shown in Table VI.

The above procedure was also used to prepare a polymer from stoichiometric amounts (0.100 mole) of 2,6-pyridinediyl dihydrazidine and p,p'-oxydibenzil. The resulting solution was divided into two equal portions and o-phenylenediamine (10.81 gm., 0.01 mole) was added to one of the stirred portions. Stirring was continued for one hour and the polymer was then poured into methanol to precipitate fibrous yellow solids which were dried and then redissolved in m-cresol (20% solids content). To this solution was then added benzil (2.10 gm., 0.01 mole) with stirring. After stirring for one hour the polymer was poured into methanol and the yellow solids obtained were dried and redissolved in m-cresol (20% solids content). The two solutions were processed as described above and the results are shown in Table VI.

TABLE VI

| Molar ratio ODB:PDH | End capping compound | Isothermal weight loss at 525° F. in static air (percent) | | Film properties after 100 and 200 hr. at 525° F. in air | |
|---|---|---|---|---|---|
| | | 200 hr. | 500 hr. | 100 hr. | 200 hr. |
| 0.98:1.00 | | 8.0 | 13.2 | Brittle, brown | Very brittle, dark brown. |
| 0.98:1.00 | Benzil | 1.7 | 3.7 | Flexible, tough, light brown | Brittle, brown. |
| 1.00:0.98 | | 9.1 | 14.1 | Brittle, brown | Brittle, dark brown. |
| 1.00:0.98 | o-Phenylenediamine | 1.7 | 3.5 | Flexible, brownish orange | Do. |
| 1.00:1.00 | | 2.2 | 4.7 | Slightly brittle, brownish color | Brittle, clear dark brown. |
| 1.00:1.00 | Benzil and o-phenylenediamine | 1.8 | 3.5 | Flexible, brownish orange | Do. |

Example 10

Tape was prepared by solution coating glass cloth carrier (112-A 1100) with a m-cresol solution (20% solids) of the fourth final polymer characterized in Tables I and II. The coated carrier was dried in a forced air oven at 300° F. to a volatiles content of less than 5%. Standard tensile shear specimens were then fabricated by assembling titanium (6A1-4V) panels with the coated carrier positioned therebetween. The bonds were cured in an autoclave starting at room temperature and increasing the temperature to 550° F. during approximately 30 min. and maintaining at 550° F. for one hour under 35 p.s.i. The resulting tensile shear specimens exhibited average room temperature strengths of 2500 p.s.i. and after aging for 2000 hours at 500° F. in air, the average room temperature strength was 2100 p.s.i.

Example 11

A prepreg was prepared by impregnating a high modulus carbon fiber reinforcement material (Morganite I—available from the Whittaker Corp.) with the polymer used in Example 10. The prepreg was then dried at 350° F. in vacuo to a total volatiles content of less than 2%. Small (2 in. x 4 in. x 9 ply) unidirectional laminates were fabricated from the composite at 550° F. for one hour under 200 p.s.i. The resulting laminates had void contents of less than 1% and resin contents of about 28%. As indicated in the test data in Table VII below, thermoplastic failure occurred at elevated temperature for unpostcured laminates while laminates postcured in nitrogen through 2 hours at 550° F. showed no thermoplastic failure.

TABLE VII

| Test condition | Flexure strength, p.s.i. | | Modulus, p.s.i.×10⁶ | | Interlaminar shear,[1] p.s.i. | |
|---|---|---|---|---|---|---|
| | Unpostcured | Postcured | Unpostcured | Postcured | Unpostcured | Postcured |
| Room temperature | 78,000 | 85,000 | 30 | 32 | 5,100 | 5,400 |
| 300° F. after 10 min | [2] 68,000 | 84,000 | [2] 26 | 32 | [2] 3,400 | 5,100 |
| 500° F. after 10 min | [2] 47,000 | 81,000 | [2] 16 | 29 | ([2]) | 4,800 |

[1] Straight beam, span to depth ratio 8:1.
[2] Thermoplastic failure.

Example 12

Films of the polymer used in Examples 10 and 11 were prepared by doctoring a solution (~18% solids content) of the polymer in m-cresol onto a glass plate. The solvent was removed by drying in a forced air oven at 70° C. for 10 hours followed by heating to 150° C. in vacuo during 2 hours and maintaining at 150° C. for 4 hours.

The clear lemon yellow film provided the properties shown in Table VII.

TABLE VIII

| Test temperature | Tensile strength, p.s.i. | Tensile modulus, p.s.i. | Ultimate elongation, percent |
| --- | --- | --- | --- |
| Room temperature | 17,500 | 375,000 | 4.6 |
| 177° C | 13,400 | 260,000 | 31.0 |

The procedures described above involving upsetting the stoichiometry of reactants and the end-capping of polymers are also useful for preventing gelling and improving the oxidative stability of polyquinoxalines prepared by the reaction of a bis-(o-diamine) and a bis-(1,2-dicarbonyl) compound.

Example 13

A random-type copolymer containing as-triazine and quinoxaline moieties and a 1:1 distribution of units of the formulae

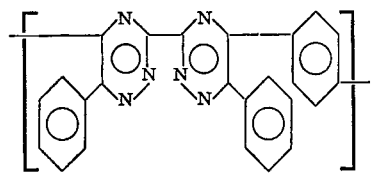

and

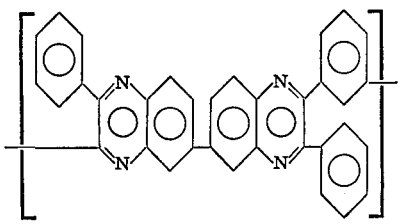

(and isomers thereof) was prepared by adding p-bis-(phenylglyoxalyl)benzene (3.424 gm., 0.010 mole) as a fine powder to a stirred slurry of oxalamidrazone (0.569 gm., 0.0049 mole) and 3,3'-diaminobenzidine (1.050 gm., 0.0049 mole) in a 1:1 mixture of m-cresol and xylene (20 ml.) cooled in a water bath. After stirring at 25° C. for 10 min., a viscous clear red-orange solution formed which increased in viscosity and became orange during the next 0.5 hour. Additional solvent (10 ml.) was added and the resulting viscous yellowish-orange solution was stirred overnight. A portion of the solution was used to cast a film on plate glass. After drying at 70° C. in air for 18 hours, followed by drying at 120° C. in vacuo for 2 hours, the clear yellow film was very tough and flexible. Another portion of the original polymer solution was poured into methanol in a Waring Blendor to precipitate a fibrous yellow solid. After thorough washing in hot methanol and drying at 130° C. in vacuo for 4 hours, the yellow polymer exhibited an inherent viscosity (0.5% m-cresol solution at 25° C.) of 1.03 dl./g., a glass transition temperature of 321° C. as determined by differential scanning calorimetry at a heating rate of 20° C./min. in nitrogen, and a polymer decomposition temperature of 391° C. as determined by thermogravimetric analysis at a heating rate of 6° C./min. in nitrogen. When exact stoichiometry was used in the polymer preparation, the polymer solution gelled after sitting at room temperature overnight.

Example 14

A block-type copolymer containing pehnyl-substituted as-triazine moieties and phenyl substituted quinoxaline moieties in a 1:1 distribution was prepared by adding p-bis(phenylglyoxalyl)-benzene (2.054 gm., 0.0060 mole) as a fine powder to a slurry of oxalamidrazone (0.5689 gm., 0.0049 mole) in a 1:1 mixture of m-cresol and xylene (10.5 ml.). The mixture was stirred overnight at ambient temperature to yield an orange oligomeric as-triazine solution. In another flask, p-bis(phenylglyoxalyl) benzene (1.370 gm., 0.0040 mole) as a fine powder was added to a slurry of 3,3'-diaminobenzidine (1.050 gm., 0.0049 mole) in a 1:1 mixture of m-cresol and xylene (10 ml.). After stirring overnight at ambient temperature, the reddish-orange oligomeric quinoxaline solution was added to the as-triazine solution with stirring. The flask was washed out with additional solvent (5 ml.) which was added to the polymer solution. After stirring overnight at ambient temperature, a portion of the viscous yellowish-orange solution was used to cast a film which was dried as in Example 13. The clear yellow film was very tough and flexible. Another portion of the polymer solution was quenched in methanol, thoroughly washed in methanol, and dried at 130° C. in vacuo for 4 hours. The fibrous yellow polymer exhibited an inherent viscosity of 1.51 dl./g., a glass transition temperature of 321° C., and a polymer decomposition temperature of 392° C., these properties being determined as in Example 13.

Example 15

A poly-as-triazine consisting of recurring units of Formula I wherein $m$ is 0, R is p,p'-oxydiphenylene, and $R_2$ and $R_3$ are each p-cyanophenyl, was prepared by adding p,p'-oxybis(p''-cyanobenzil) (2.422 gm., 0.0050 mole) as a fine powder to a slurry of oxalamidrazone (0.569 gm., 0.0049 mole) in a 1:1 mixture of m-cresol and xylene (12 ml.). After stirring at approximately 25° C. for 10 min., a viscous orange solution formed and was stirred overnight. A portion of the viscous orange solution was used to cast a film which, after drying, was very tough and flexible. The remainder of the polymer solution was quenched in methanol in a Waring Blendor to precipitate a fibrous yellow solid. After washing in methanol and drying at 130° C. in vacuo for 4 hrs., the fibrous yellow solid exhibited an inherent viscosity of 1.15 dl./g., a glass transition temperature of 285° C., and a polymer decomposition temperature of 394° C., these properties being determined as in Example 13. It will be apparent that the nitrile substituents in the polymer so prepared can be readily hydrolyzed to carboxyl groups which can in turn be converted to acid chlorides by reaction with thionyl chloride. The acid chlorides can in turn be reacted with alcohols and amines to produce esters and amides, respectively. The p,p'-oxybis(p''-cyanobenzil) employed in the foregoing procedure was prepared as follows. p-Cyanophenylacetic acid was obtained by diazotizing p-aminophenylacetic acid and coupling the diazonium salt with cuprous cyanide. p-Cyanophenylacetic acid was converted to the acid chloride with thionyl chloride. A solution of the acid chloride and diphenyl ether in methylene chloride was added to a slurry of anhydrous aluminum chloride in methylene chloride at 5°–8° C. The resulting red reaction mixture was poured onto ice and hydrochloric acid. The organic phase was separated, washed with water, dried over calcium sulfate, and concentrated to yield a brown residue. Recrystallization from ethanol provided the intermediate diketone as a pale yellow granular crystalline solid (M.P. 186°–188° C.), which was oxidized with selenium dioxide in glacial acetic acid to afford the p,p'-oxybis(p''-cyanobenzil). Recrystallization from a mixture of alcohol and benzene afforded a yellow crystalline solid, M.P. 183–185° C. with decomposition (solidifies then remelts at 201° C.). The infrared spectrum exhibited a sharp band at 4.5µ characteristic of nitrile group. Elemental analysis gave the following results.

*Analysis.*—Calcd. for $C_{30}H_{16}N_2O_5$ (percent) C, 74.37; H, 3.33; N, 5.78. Found (percent): C, 74.28; H, 3.36; N, 5.66.

Example 16

Oxalamidrazone was separately reacted with stoichiometric quantities of seven bis-(1,2-dicarbonyl) compounds to produce poly-as-triazines consisting of recurring units of Formula I, wherein $m$ is 0, $R_1$, $R_2$ and $R_3$ are as indicated in Table IX. Polymers 1-3 (see Table IX) were prepared in m-cresol at 20% solids content and temperatures of approximately 70° C. During preparation of polymer 1, the polymer precipitated from solution as an orange solid. At 5% solids content, the polymer failed to dissolve completely in m-cresol, hexamethylphosphoramide or dimethyl sulfoxide. Polymers 2 and 3 readily formed viscous solutions at 20% solids content in m-cresol, but failed to form complete solutions in hexamethylphosphoramide or dimethyl sulfoxide at 5% solids content. Polymers 4-7 were prepared in high molecular weigth form in a 1:1 mixture of m-cresol and xylene, at room temperature and at solids content of 10%. In each case, a clear yellowish-orange, viscous solution formed on a 0.010 molar scale after approximately 0.5 hr. Tough, flexible, transparent, yellow films were cast from these solutions.

TABLE IX

| Polymer No. | Formula I ($m=0$) | $R_2$ and $R_3$ | $\eta_{inh}$,[1] dl./g. | $T_g$[2] °C. |
|---|---|---|---|---|
| 1 | p-Phenylene | Hydrogen | 0.65 | 260 |
| 2 | p,p'-Oxydiphenylene | do | 1.48 | 244 |
| 3 | p,p'-Thiodiphenylene | do | 1.52 | 240 |
| 4 | m-Phenylene | Phenyl | 1.47 | 295 |
| 5 | p-Phenylene | do | 1.32 | 302 |
| 6 | p,p'-Oxydiphenylene | do | 1.96 | 270 |
| 7 | p,p'-Thiodiphenylene | do | 1.85 | 260 |

[1] 0.5% m-cresol solution at 25° C.
[2] Glass transition temperature determined by differential scanning calorimetry at a heating rate of 20° C./min. in nitrogen.

What is claimed is:

1. Poly-as-triazines consisting essentially of recurring units of the formula

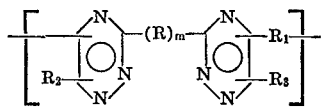

wherein $m$ is 0 or 1; R is a divalent radical selected from

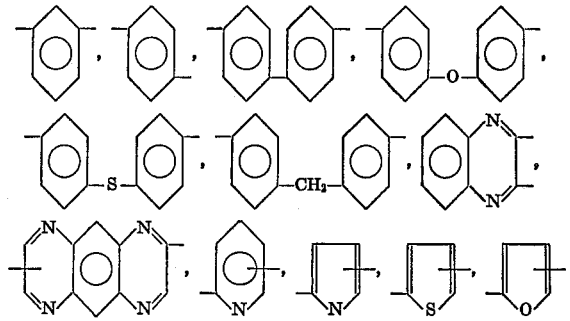

—(CH$_2$)$_y$—, and —(CF$_2$)$_y$— where $y$ is an integer of from 1 to 12; $R_1$ is a divalent radical selected from

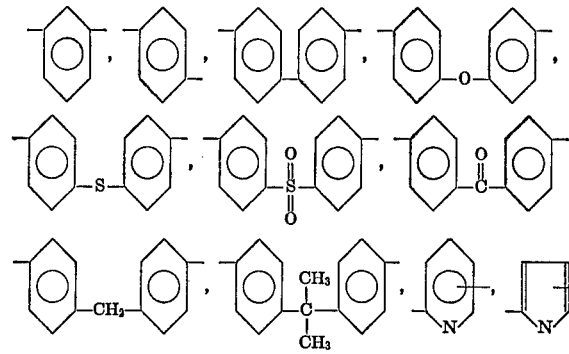

and —(CH$_2$)$_z$— where $z$ is an integer of from 2 to 12; and $R_2$ and $R_3$ are monovalent radicals individually selected from alkyl of 1 to 12 carbon atoms, phenyl, and substituted phenyl wherein the substituents are substantially inert.

2. Poly-as-triazines of claim 1 wherein $R_2$ and $R_3$ are each phenyl.

3. Poly-as-triazines of claim 2 wherein $m$ is 0 or 1; R is selected from

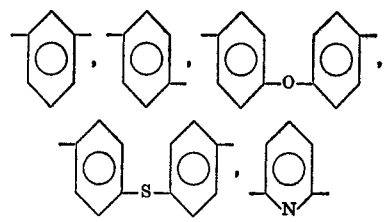

and —(CF$_2$)$_y$— where $y$ is an integer of from 1 to 12; and $R_1$ is selected from

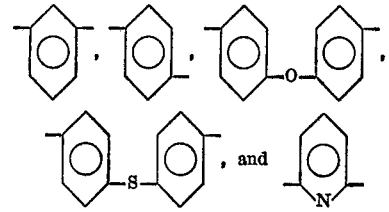

4. Poly-as-triazines of claim 1 further consisting essentially of recurring units of the formula

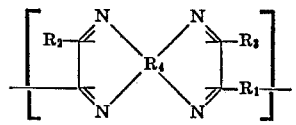

wherein $R_1$, $R_2$ and $R_3$ are as defined in claim 1 and $R_4$ is a tetravalent radical selected from

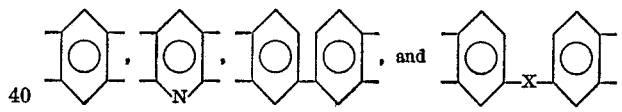

where X is selected from —O—, —S—, —SO—, —SO$_2$—, —CO—, —CH$_2$—, and

5. Poly-as-triazines of claim 1 consisting essentially of at least 20 of said units.

6. Poly-as-triazines consisting essentially of recurring units of the formula

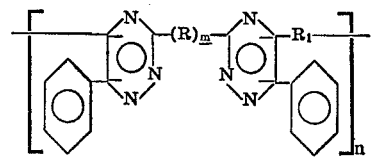

wherein $m$ is 0 or 1; $n$ is an integer of at least about 20; R is a divalent radical selected from

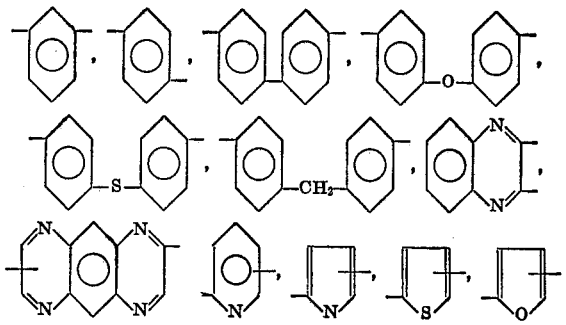

and —$(CH_2)_y$— where $y$ is an integer of from 1 to 12; and $R_1$ is a divalent radical selected from

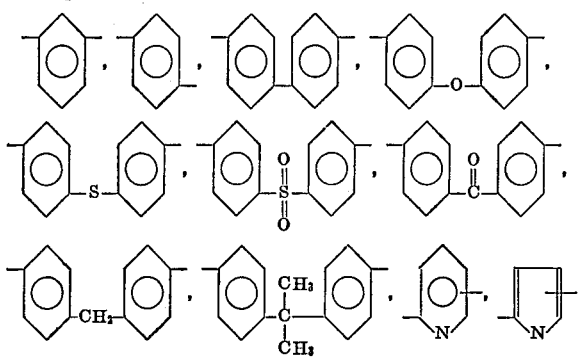

and —$(CH_2)_z$— where $z$ is an integer of from 2 to 12.

7. Poly-as-triazines of claim 6 wherein R is selected from

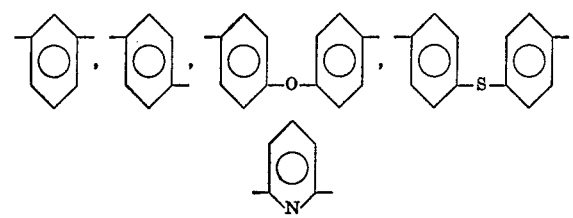

and —$(CF_2)_y$— where $y$ is an integer of from 1 to 12; $R_1$ is selected from

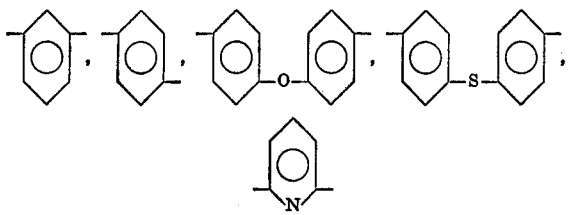

8. A process for the preparation of poly-as-triazines consisting essentially of at least 20 recurring units of the formula

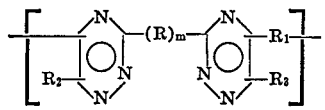

wherein $m$ is 0 or 1; R is a divalent radical selected from

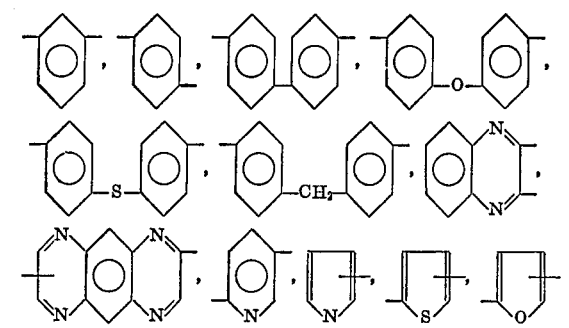

—$(CH_2)_y$—, and —$(CF_2)_y$— where $y$ is an integer of from 1 to 12; $R_1$ is a divalent radical selected from

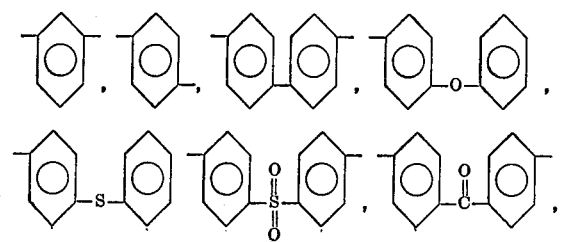

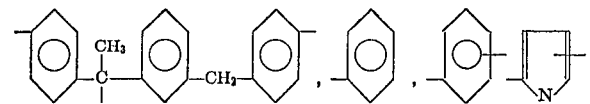

and —$(CH_2)_z$— where $z$ is an integer of from 2 to 12; and $R_2$ and $R_3$ are monovalent radicals individually selected from hydrogen, alkyl of 1 to 12 carbon atoms, phenyl, and substituted phenyl wherein the substituents are substantially inert; comprising reacting a dihydrazidine of the formula

with a bis-(1,2-dicarbonyl) compound of the formula

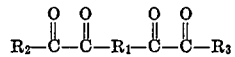

in a solvent selected from the group consisting of m-cresol, anisole, pyridine, chloroform, sym-tetrachloroethane, mixtures thereof and mixtures of xylene or toluene with m-cresol or sym-tetrachloroethane.

9. The process of claim 8 wherein said solvent comprises m-cresol.

10. The process of claim 8 wherein $R_2$ and $R_3$ are each phenyl.

11. The process of claim 10 wherein said solvent comprises m-cresol.

12. The process of claim 8 wherein $m$ is 0 or 1; R is selected from

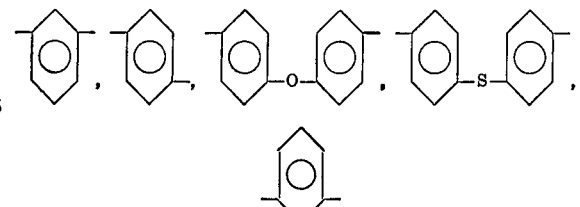

and —$(CF_2)_y$— where $y$ is an integer of from 1 to 12; $R_1$ is selected from

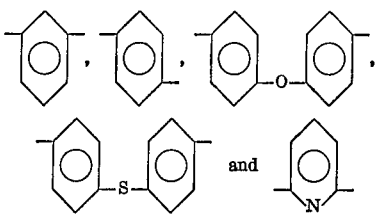

and $R_2$ and $R_3$ are each phenyl.

13. The process of claim 12 wherein said solvent comprises m-cresol.

14. The process of claim 8 wherein the quantity of said dihydrazidine is from 0.975 to 1.025 mole per 1.000 mole of said bis-(1,2-dicarbonyl) compound.

15. The process of claim 14 wherein $R_2$ and $R_3$ are each phenyl.

16. The process of claim 8 wherein the quantity of said dihydrazidine is from 0.990 to 1.010 mole per 1.000 mole of said bis-(1,2-dicarbonyl) compound.

17. The process of claim 8 wherein the quantities of dihydrazidine and bis-(1,2-dicarbonyl) compound are in proportions of from 0.975 to 0.995 mole of one per 1.000 mole of the other.

18. The process of claim 17 wherein $R_2$ and $R_3$ are each phenyl.

19. The process of claim 18 wherein said solvent comprises m-cresol.

20. The process of claim 8 further comprising reacting said poly-as-triazine with at least one compound selected from benzil, benzoyl chloride, o-phenylenediamine, and 2-pyridylhydrazine whereby there are formed as-triazine, 1,2,4-triazole or quinoxaline end groups thereon.

21. The process of claim 8 wherein $R_2$ and $R_3$ are individually selected from alkyl, phenyl, and substituted phenyl.

22. Poly-as-triazines of claim 6 wherein $m$ is 1 and R is

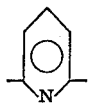

23. Poly-as-triazines of claim 6 wherein $m$ is 1, R is

and $R_1$ is

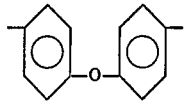

24. The process of claim 8 wherein $m$ is 1, R is

and $R_2$ and $R_3$ are each phenyl or substituted phenyl.

25. The process of claim 8 wherein $m$ is 1, R is

$R_1$ is

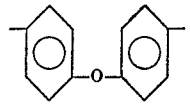

and $R_2$ and $R_3$ are each phenyl or substituted phenyl.

References Cited

UNITED STATES PATENTS

| | | | |
|---|---|---|---|
| 3,594,349 | 7/1971 | Culbertson | 260—72 |
| 3,021,328 | 2/1962 | Morin et al. | 260—248 |

LESTER L. LEE, Primary Examiner

U.S. Cl. X.R.

117—124 E; 161—257 260—32.6 N, 33.4 P, 33 XR, 51.5, 65, 72 R, 72.5, 849

UNITED STATES PATENT OFFICE
CERTIFICATE OF CORRECTION

Patent No. 3,778,412     Dated December 11, 1973

Inventor(s) Paul M. Hergenrother

It is certified that error appears in the above-identified patent and that said Letters Patent are hereby corrected as shown below:

Claim 8, column 19, lines 59-63, change the third formula from 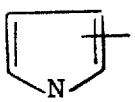 to 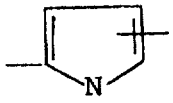 ;

column 20, lines 1-5, change the first three formulae from

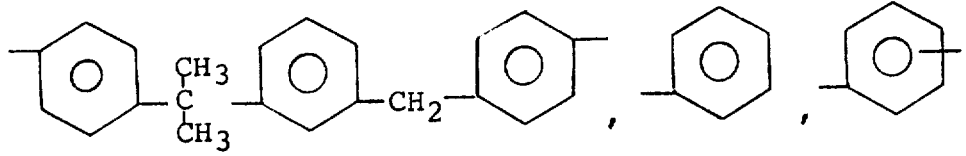

to

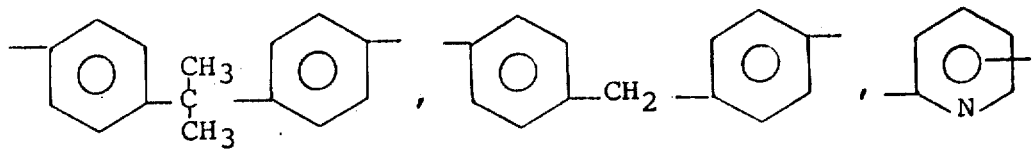

Signed and sealed this 20th day of August 1974.

(SEAL)
Attest:

McCOY M. GIBSON, JR.      C. MARSHALL DANN
Attesting Officer           Commissioner of Patents